United States Patent Office 3,352,548
Patented Nov. 14, 1967

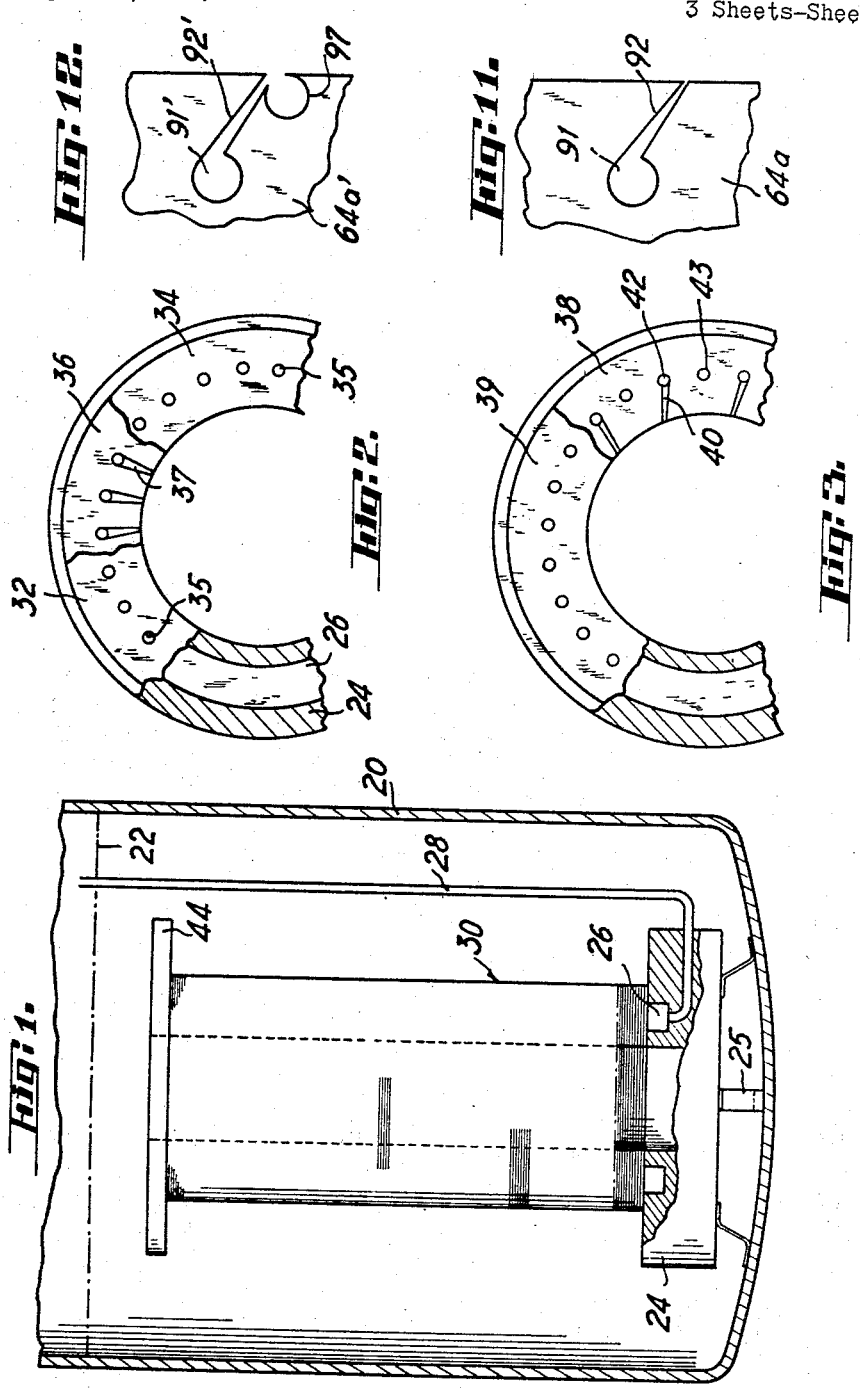

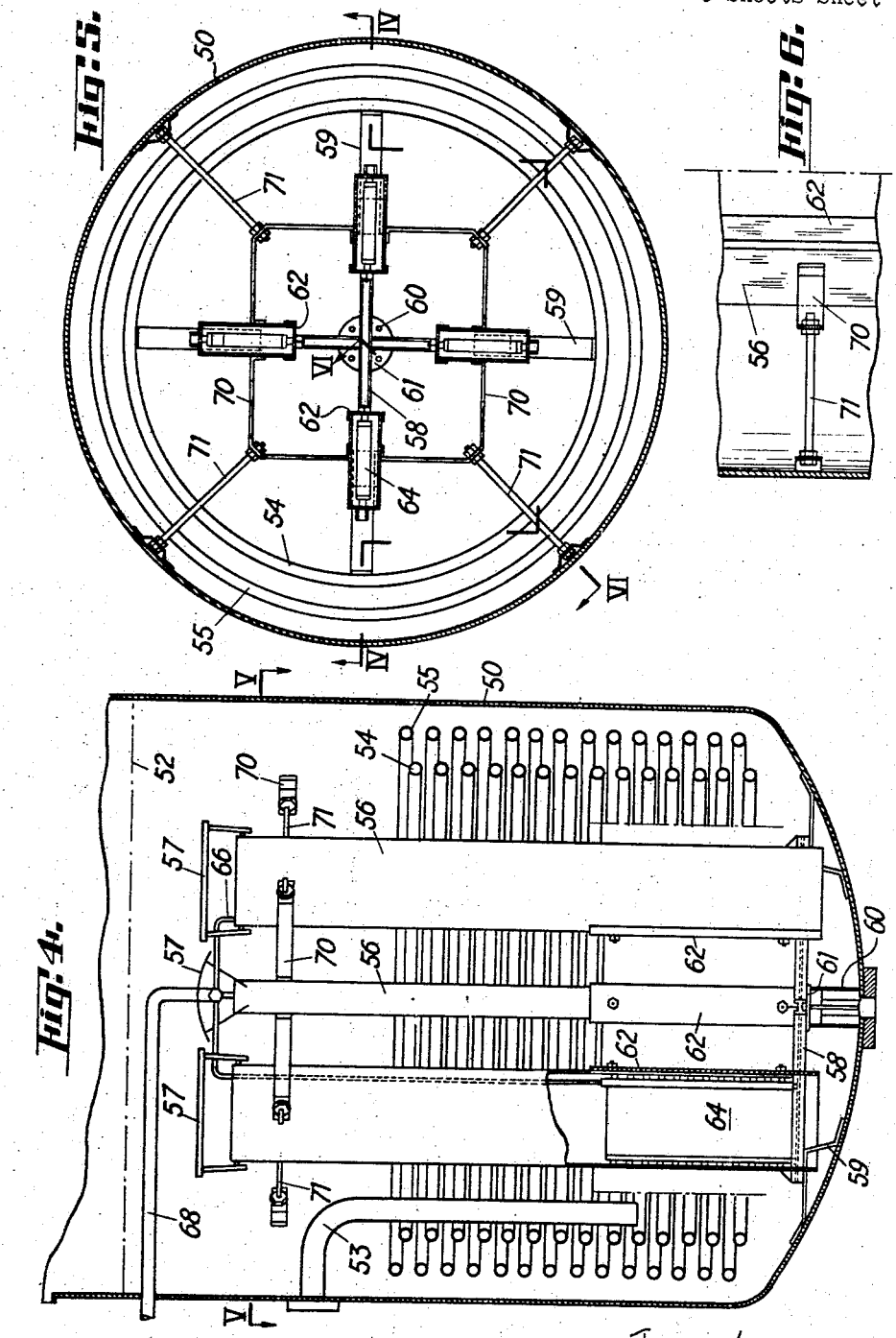

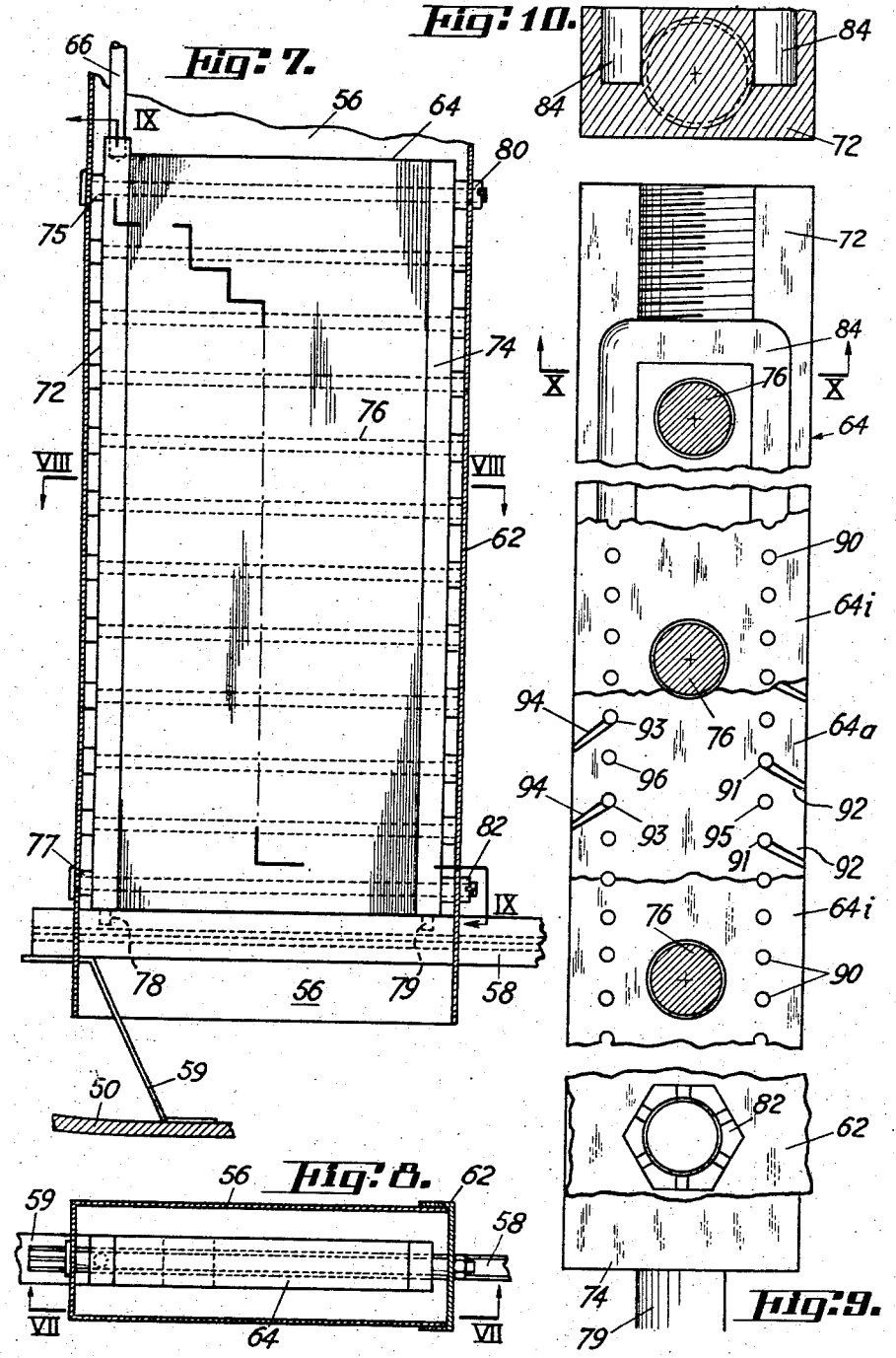

3,352,548
GAS AND LIQUID CONTACT APPARATUS
Pierre Godet, l'Isle-Adam, and Alain Dieudonné,
Asnieres, France, assignors, by mesne assignments, to Oleostin, Paris, France, a corporation of France
Filed Sept. 23, 1964, Ser. No. 398,618
Claims priority, application France, Oct. 9, 1963, 950,114
3 Claims. (Cl. 261—124)

ABSTRACT OF THE DISCLOSURE

Apparatus for producing gas and liquid contacts, notably for deodorizing edible oils, which comprises a vessel containing the liquid, at least one vertical duct extending within said vessel and a device for injecting gas into said duct, characterised in that the gas injection device consists of a stack of inert and active plates, all of said plates having longitudinal orifices formed therethrough which communicate with one another and with a source of gas, each active plate being also formed with notches causing each longitudinal orifices to communicate with the lateral surface of the plate, the various notches constituting gas injection nozzles.

---

This invention relates to an apparatus for bringing gases and liquids into contact and more especially to an apparatus for deodorizing edible oils.

Many apparatus are known which permit bringing gases and liquids into contact, such as those used for the deodorizing of oils or for the hydrogenation of a liquid in the presence of a catalyst in suspension in said liquid.

The present application having more particularly for its object an apparatus for deodorizing edible oils such an apparatus will be referred to in the following description but it is evident that the same problems have to be solved in apparatus designed for executing other analogous contacts between gases and liquids. For this reason, the invention must not be considered as limited to this particular gas-liquid contact which is the deodorization of oils.

In the particular field of the deodorization of oils, there have been used until this day intermittent or batch apparatus in which a mass of oil is deodorized by passing steam therethrough said steam catching the odorous impurities from which the oil is then let free.

Known apparatus generally comprise a vessel in which oil is maintained at a temperature from 150 to 200° C. and means for injecting steam into the oil. In such apparatus a circulation of oil is created by variation of the specific gravity of the oil-steam mixture which is less than the one of the oil itself.

These known apparatus need large volumes of steam for a given treatment and this treatment is completed only after a relatively long period of time. This is detrimental to possible yield of the apparatus, to the operation costs and to the stability of the products obtained since this stability depends on the time during which the oil has been heated, and the shorter this heating time the better the oil obtained. Furthermore, since large quantities of steam are used which, under vacuum conditions, attain a high speed upon leaving the mass of oil, it is necessary to have a relatively small filling percentage of the apparatus to avoid stripping of the liquid by the steam.

The invention has for its object an apparatus of reduced size permitting the treatment of larger quantities of oil in using smaller quantities of steam while obtaining a substantial reduction of the treatment duration.

The apparatus for bringing gases and liquids into contact according to the invention is of the type comprising a vessel for the liquid and injection means for the gas, said injection means being provided in at least one vertical sleeve open at its base and at its top with of view to obtaining the recycling of the liquid under the action of the injection of the gas into the liquid. This apparatus is characterized in that the said injection means consist of nozzles distributed in said sleeve along at least a part of the height of latter, the hydraulic diameter of said nozzles being very small with respect to their length.

According to a specific embodiment of the invention, the sleeve is made, at least for a part of it, by stacking of annular coaxial plates comprising aligned orifices forming ducts supplying gas to indentations opening into the internal wall of the sleeve said indentations being formed in at least some of these plates and constituting with adjacent plates the above mentioned nozzles.

According to another embodiment of the invention, the sleeve consists of a parallelepipedic chimney enclosing a parallelepipedic block comprising the nozzles for injecting the gas, said nozzles being directed toward the inner walls of said chimney. The nozzle block is constituted by a stack of vertically extending plates comprising aligned orifices defining in said block horizontal gas supplying ducts for nozzles formed by cuttings or indentations connecting in some of the plates some of said orifices to the edges of these plates.

Other objects and their attendant advantages will become apparent as the following detailed description is read in conjunction with the accompanying drawings wherein:

FIGURE 1 shows in axial cross-section, partly broken away, a pilot apparatus for deodorizing oil;

FIGURE 2 is a partial cross-section along different planes of the nozzle block of the apparatus of FIGURE 1;

FIGURE 3 is a partial transversal cross-section, with parts broken away, showing another design of nozzles;

FIGURE 4 shows, in axial cross-section, with parts broken away, an industrial apparatus for deodorizing oils according to the present invention;

FIGURE 5 is a cross-section taken along line V—V of FIGURE 4;

FIGURE 6 is a partial cross-sectional view along line VI—VI of FIGURE 5;

FIGURE 7 is an enlarged broken vertical cross-sectional view of a chimney containing a nozzle block as used in the apparatus of FIGURE 4;

FIGURE 8 is a horizontal cross-sectional view taken along the line VIII—VIII of FIGURE 7;

FIGURE 9 is a stepped cross-sectional view of the block of FIGURE 7 taken to show the different plates constituting said block;

FIGURE 10 is a cross-sectional view taken along line X—X of FIGURE 9, or in other terms, of the supplying flange of the nozzle block of the apparatus of FIGURE 4;

FIGURES 11 and 12 show at a larger scale two types of indentations forming nozzles that can be used in the stacks of plates of the invention.

It is well known that there exists in an oil to be deodorized two kinds of noxious products which it is necessary to strip off by means of steam, namely: on the one hand, products that are already odorous and which are at a free state and are stripped off by distillation under vacuum since they are more volatile than the oil and, on the other hand, products which, while not being odorous at the origin, would become odorous during a subsequent storage of the oil, these latter products are hydrolysable and can thus be stripped off by steam.

In the conventional processes, steam is injected in the form of large bubbles thus defining a given area of contact between the steam bubbles and the oil to be treated. It is evident that when the large bubbles are divided into microscopic bubbles, it is possible to increase considerably the area of contact and to accelerate consequently the deodorization process. However, the division obtained by means of porous plates or of ported plates is not sufficient. In effect, the transfer ratio between a liquid phase and a gaseous phase is not only a function of the area of contact between the fluids but also a function of the relative velocity of the two phases one with respect to the other. It is then necessary to look for an increase of the area of contact together with an increase of the injection velocity of the gas (steam in certain cases) into the liquid (oil for instance).

In view of the foregoing, applicant has designed a pilot apparatus and then industrial plant. It has been remarked that the yield of the plant thus set in operation could be considerably improved and that it was possible by a suitable choice of the dimensions of the parts used, to reduce considerably the steam consumption in the case of oil deodorization, this consumption being five times less than the one of the prior art apparatus for the same amount of treated oil. The time of treatment has also been substantially reduced. It is about 30% less than in the known installation. Furthermore, the good penetration of steam into the mass of oil to be treated on the one hand, and the reduction of the oil stripped over the free surface of the liquid on the other hand, have rendered possible the treatment of larger quantities of oil in apparatus of the same size.

There will be described herebelow a pilot apparatus and then the industrial plant derived therefrom.

FIGURE 1 shows, in broken axial cross-sectional view, a pilot apparatus for deodorizing oil. This apparatus comprises a vessel 20 the top portion of which (broken away on the drawing) is connected to a vacuum pump (not shown). Vessel 20 is filled with oil to be deodorized the surface of which has been shown by phantom line 22. On the bottom of vessel 20 is secured a sleeve forming structure for the recycling of the oil to be deodorized. This structure comprises a block formed with a vertical axial passage for the oil and injection means for the steam to be injected into said block.

In the example of the FIGURE 1, said sleeve forming block comprises an annular lower flange 24 secured to the bottom of vessel 20 by legs 25. An annular groove 26 is formed in the upper face of flange 24, said groove 26 being connected to a tube 28 itself connected to a source of superheated low pressure steam (not shown).

Annular plates coaxially stacked upon flange 24 constitute a block 30.

These plates are of two kinds and will be respectively designated "neutral" and "active." As shown in FIGURE 2, the neutral plates such as plates 32–34 are provided with circular orifices 35 distributed on a circle the diameter of which is comprised between the inner and outer diameters of groove 26. The active plates such as plate 36 are provided with indentations 37 each comprising a circular orifice forming portion substantially of the same size as orifices 35 of plates 32–34 and a rectilinear portion the latter opening in the inner edge of the plate 36. In the example of FIGURE 2 the rectilinear portions of indentations 37 converge toward the center of plate 36. The example of FIGURE 3 shows an active plate of another design which is provided with indentations similar in every respect to those of FIGURE 2 except in that the rectilinear portions thereof are at an angle with radii drawn from the center of said plates to the orifice forming portions of said indentations. Such an arrangement permits to generate a stirring effect into the fluids in the central passage of block 30 obtained by the stacking of the annular plates thereof.

When considering FIGURE 3, it may be seen that an active plate 38 presents nozzle forming indentations each of which comprises a circular portion 42 and a rectilinear portion 40 which latter opens in the inner edge of plate 38. Between two successive circular portions or orifices 42 connected to the inner edge of plate 38 by rectilinear portions 40, there is provided in plate 38 an orifice 43 which is aligned with a corresponding orifice provided in a neutral plate 39 interposed between two successive active plates 38. It will be easily understood that such an arrangement renders possible the disposition of the openings of the nozzle forming indentations according to a staggered or zigzag pattern.

According to a preferred embodiment of the pilot apparatus the inner radius of the annular plates ranges from 2 to 5 cm. (.8 to 2 in.), the diameter of the orifices formed in said plates is about 5 mm. (.2 in.) and the nozzle forming indentations are from 4 to 12 mm. long (.15 to .5 in.) and from .1 to .5 mm. wide (.004 to .02 in.). The spacing between two adjacent nozzle openings of a same plate is comprised between 8 and 20 mm. (.35 to .8 in.) according to the desired density of nozzle openings per unit of surface of the wall of the passage formed in block 30. Preferably, the number of openings will be of 100 to 500 openings per sq. dm. (about 1000 to 5000 per sq. ft.). This density is obtainable by conveniently choosing the thickness of the plates (for example .1 to .5 mm. about .004 to .02 in.) and the number of neutral plates interposed between successive active plates.

The neutral and active plates (either of the type shown in FIGURE 2, or of the type shown in FIGURE 3, or of any other type differing from the plates of FIGURE 2 or 3 in respect of the form and/or inclination of the nozzle forming indentations) are stacked on tie-rods (not shown for the sake of clarity) which may consist of studs screwed in flange 24 and threaded through aligned orifices or notches formed in said plates. These tie-rods maintain the plates between the flange 24 and an upper annular flange 44.

The operation of the above mentioned pilot apparatus is very simple. The oil contained in vessel 20, the upper part of which is under vacuum, is maintained at a temperature of 150° to 200° C. Steam is injected through tube 28, groove 26 of flange 24, and nozzle forming indentations 37 or 40 (according to the type of active plates which are used) into the central passage of block 30. The mixture of steam bubbles and oil thus obtained brings about a change in the specific gravity of the fluids in said central passage resulting in the recycling of the oil and in the stripping by the steam of the odorous products from the oil. To this end use is made of slightly superheated steam, at low pressure of about .1 to .3 kg./cm.$^2$ abs. (15 to 40 p.s.i.a.)

FIGURES 4 to 6 show an industrial apparatus for deodorizing oil. This apparatus comprises a tank forming vessel 50 the upper part of which (partly broken away on the drawing) is connected by suitable means to a vacuum pump or like apparatus. An interrupted line 52 shows the oil level in tank 50. The tank 50 is fed with oil through a feeding pipe 53. Two heating coils 54–55 coaxially disposed inside said tank 50 are heated to bring the oil at a temperature of 150° to 200° C.

Four chimneys 56 topped by deflecting devices 57 are mounted in tank 50. The chimneys 56 are substantially parallelepipedic and are opened at their bases and at their tops. Their bases are provided with notches which are set straddlewise on a cross member formed of U shaped irons which are disposed back to back and are designated by the general reference numeral 58. The irons 58 are secured on the bottom of tank 50 by means of hoop irons 59 and also by means of rods 60 and of an annular plate 61 connecting the center point of the cross member with the plug of tank 50. Each chimney 56 comprises a cover plate 62 on its side directed toward the center of tank 50, said cover plates permitting the insertion therein of a block 64 provided with nozzle forming means to be described herebelow.

The blocks 64 located at the base of chimneys are fed with steam by four tubes or pipes 66 symmetrically disposed with respect to the axis of tank 50. Steam is fed to the four tubes 66 by a feeding line 68 connected to a source of superheated steam the pressure of which is preferably of .1 to .3 kg./cm.² abs. (15 to 40 p.s.i.a.) The chimneys are maintained in position at their top by means of hoop irons 70 and tie-rods 71. FIGURES 4–6 clearly shows the mounting of these irons and tie-rods.

The structural parts of block 64 will appear more clearly when considering FIGURES 7–10. This block 64 is of a substantially parallelepipedic configuration and is formed of a series of superimposed plates pressed closed together by tie-rods 76 between two end flanges 72 and 74. The tie-rods 76 are provided at one end with a head and at the other end with a threaded portion a nut being screwed thereon so as to maintain the plates tightened between the two end flanges. The heads 75 and 77 of the higher and lower tie-rods respectively are internally threaded to receive screws securing the block 64 inside the chimneys 56. In effect, the block 64 is mounted in chimneys 56 before the lid 62 is set in position by causing the lower edges of flanges 72–74 to slide on the upper U shaped irons of the cross member 58, the block 64 being guided by studs 78–79 provided on the lower edge of flanges 72 and 74 respectively. As shown in FIGURES 7–9 the cover 62 is secured on the chimney by two nuts 80–82 screwed on the threaded end of the higher and lower tie-rod respectively.

The flange 72 of substantially parallelepipedic configuration is formed with a groove 84 having two vertically extending lateral branches which are fed by a pipe 66 which is screwed in a corresponding threaded portion of flange 72.

Block 64 is formed of thin rectangular plates of sheet-metal having the same size as the flange 74. These plates are formed with central orifices for the passage of the tie-rods 76 (twelve in number in the present example). The block 64 comprises two type of plates: on the one hand, active plates (which play the same part as the active plates 36 or 38 of FIGURES 2 and 3) and on the other hand neutral plates which are interposed between the active plates and define nozzle means with the indentations formed in said active plates (these neutral plates play the same part as neutral plates 34 and 39 of FIGURES 2 and 3).

In FIGURE 9, reference numeral 64a designates a portion of an active plate visible on the stepped cross sectional view and reference numeral 64i two portions of neutral plates similar to those adjacent to plate 64a. Neutral plates 64i and active plates 64a both comprise orifices located in the vicinity of the outer edge of the plate and substantially located along the axis of the longitudinal grooves 84 of flange 72. It will be apparent that said aligned orifices constitute horizontal ducts through which is circulated the steam admitted in flange 72 up to flange 74 which is formed of a thick plate provided only with orifices for the passage of tie-rods 76.

As shown in FIGURE 9 neutral plates 64i are only provided with evenly distributed orifices 90 whereas active plates 64a are formed with orifices similar to orifices 90 and other orifices connected to the lower edge of plate 64a by downwardly inclined indentations. There is shown on plate 64a of FIGURE 9 orifices 91 and 93 connected to the edge of said plate by rectilinear indentations 92 and 94 respectively. Between two orifices 91 as well as between two orifices 93 is located a nonconnected orifice 95—between orifices 91, or 96—between orifices 93; orifices 95–96 are only used to insure a continuous flow of steam from the groove 84 through the entire stack of plates which form the block 64 whereas orifices 91–93 and indentations 92–94 are used for ejecting steam from block 64 with a downwardly inclination toward the inner face of the lateral wall of the chimney 56 wherein said block is located. The horizontal rows of aligned nozzle forming openings which open in the lateral walls of block 64 have not been shown in FIGURE 7 in order to clarify the drawing. The nozzle forming openings may of course form also vertical rows when all the stacked plates 64a are exactly superimposed. It is evident that by a 180° rotation of each alternate plate 64a, it is possible to obtain a staggered disposition of the nozzle forming openings since orifices 96–91 and orifices 93–95 are respectively located in a same horizontal plane.

What ever the disposition of the nozzle forming openings (either in rows or in staggered arrangement) the spacing between two adjacent vertical planes containing such openings depends on the thickness of the neutral plate or plates interposed between two consecutive active plates. Preferably the active plates are all of the same thickness and are of .1 to .5 mm. thick (.004 to .02 in.) the neutral plates 64i are five to twenty times thicker than the active plates 64a.

FIGURE 11 shows, at a greater scale, an advantageous design of a nozzle forming indentation 91–92.

FIGURE 12 relates to another form of execution of a nozzle forming indentation according to which a plate 64a' is formed with orifices 91' and with indentations 92' each of which opens in the outer edge of plate 64a' at the level of a cavity forming resonance cavity for one of the frequencies of the fluid circulating in duct 92'. The circular indentation provided in plate 64a', to form said resonance cavity in combination with neutral plates, has been designated by reference numeral 97.

The superimposed orifices 90–91–93, etc., which form admission ducts have preferably a diameter from about 2 to 8 mm. (.8 to .32 in.) the nozzle forming indentations are from about 5 to 20 mm. long (.2 to .8 in.) and the thickness of the active plates formed with such indentations and the width of said indentations are so chosen that the hydraulic diameter of said nozzle forming indentations is of about .1 to .6 mm. (.004 to .024 in.). It has been observed that the best results were obtained for a surface density of nozzle forming openings of between 100 to 500 per sq. dm. (about 1000 to 5000 per sq. ft.) according to the steam pressure and to the nature of the oil.

What we claim is:

1. Apparatus for bringing gas and a liquid into contact more especially for deodorizing edible oils, comprising a source of gas, a vessel containing the liquid, a substantially vertical sleeve in said vessel, openings at the top and bottom of said sleeve, a stack of plates in the sleeve and spaced from the sleeve wall, and gas injection means located in said plates and connected to the source of gas, said gas injection means comprising first and second plates, duct forming aligned orifices being provided in said first and second plates and communicating with said source of gas, and nozzle forming indentations being provided in each second plate between said orifices and the edge of said second plate.

2. Apparatus as claimed in claim 1 wherein said gas injection means comprises rectangular stacked plates located inside of and apart from the wall of the lower part of said sleeve.

3. Apparatus as claimed in claim 1 wherein said first and second plates are alternately stacked.

References Cited

UNITED STATES PATENTS

| 313,431 | 3/1885 | Kuhn | 261—124 X |
| 1,044,175 | 11/1912 | Hennebutte | 261—124 X |
| 2,378,029 | 6/1945 | O'Brien | 261—124 X |
| 3,218,133 | 11/1965 | Ebner | 261—124 X |
| 3,243,169 | 3/1966 | Caudle et al. | 261—124 X |

HARRY B. THORNTON, *Primary Examiner.*

E. H. RENNER, *Assistant Examiner.*